No. 683,740. A. M. FERGUSON. Patented Oct. 1, 1901.
PNEUMATIC WHEEL TIRE.
(Application filed Mar. 29, 1901.)
(No Model.)
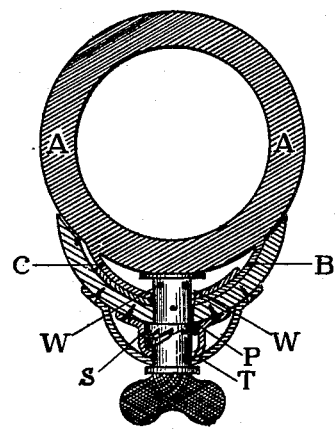
WITNESSES:
INVENTOR
BY
ATTORNEY

UNITED STATES PATENT OFFICE.

ALBERT MARION FERGUSON, OF WINNIPEG, CANADA, ASSIGNOR OF TWO-THIRDS TO THOMAS CARROLL ALLUM AND HENRY DUNCAN METCALFE, OF MONTREAL, CANADA.

PNEUMATIC WHEEL-TIRE.

SPECIFICATION forming part of Letters Patent No. 683,740, dated October 1, 1901.

Application filed March 29, 1901. Serial No. 53,537. (No model.)

*To all whom it may concern:*

Be it known that I, ALBERT MARION FERGUSON, a citizen of the United States of America, residing at No. 30 Redwood avenue, in the city of Winnipeg, in the Province of Manitoba, Canada, have invented a new and useful Wheel-Tire, and the following is a specification of the same.

The invention is illustrated in the accompanying drawing, which shows a cross-section of the tire of a wheel.

It consists in a single-tube detachable pneumatic tire A with two bands B and C, one edge of each longitudinally cemented along the entire inner circumference of the tire and overlapping. The tube is secured to the rim by a wire W, inserted between the tube and the two bands. The two ends of the wire are introduced in two holes of a metal post P, provided with a thumb-screw head, a ratchet-wheel, and its pawl. The post is provided at its foot with a small plate to protect the tube and to prevent the post from sliding out of its socket S. A plate T covers the whole to protect it from dust. When the tube is set in its place on the rim of the wheel, the ends of the wire are introduced in the two holes of the post. Then the post is turned in its socket until the wire is properly taut and the tube fits close home in the rim of the wheel.

I do not claim as my invention pneumatic tires for wheels; but

What I claim as my invention, and desire to secure by Letters Patent, is—

A single detachable pneumatic tire having two longitudinal bands fastened to the inner circumference of the tire overlapping on a metal wire longitudinally stretched between said two bands and the tube; a ratchet-post with its pawl to tighten said wire and secure tire to the rim, all substantially as set forth.

In testimony whereof I have signed my name to this specification in presence of two subscribing witnesses.

ALBERT MARION FERGUSON. [L. S.]

Witnesses:
 C. A. PRIEUR.  [L. S.]
 A. BELLOVANCE.  [L. S.]